(12) United States Patent
Hunter

(10) Patent No.: US 6,978,773 B2
(45) Date of Patent: Dec. 27, 2005

(54) BREATHER SYSTEM FOR A MOTORCYCLE ENGINE

(76) Inventor: Shane Hunter, 72 Fletcher Street, Edgeworth NSW (AU) 2285

( * ) Notice: Subject to any disclaimer, the term of this patent is extended or adjusted under 35 U.S.C. 154(b) by 0 days.

(21) Appl. No.: 10/706,413

(22) Filed: Nov. 12, 2003

(65) Prior Publication Data

US 2004/0144375 A1    Jul. 29, 2004

(30) Foreign Application Priority Data

Nov. 12, 2002    (AU) .............................. 2002952646

(51) Int. Cl.⁷ .......................................... F01M 13/00
(52) U.S. Cl. .................................................. 123/572
(58) Field of Search ...................... 123/184.21–184.61, 123/572–574

(56) References Cited

U.S. PATENT DOCUMENTS

| | | | |
|---|---|---|---|
| 4,541,399 A | 9/1985 | Tanaka et al. | |
| 4,656,991 A | 4/1987 | Fukuo et al. | |
| 4,681,068 A | 7/1987 | Anno et al. | |
| 5,233,967 A | 8/1993 | Peller | |
| 5,307,784 A | 5/1994 | Choma et al. | |
| 5,586,996 A | * 12/1996 | Manookian, Jr. ............ | 55/321 |
| 5,937,816 A | 8/1999 | Wincewicz et al. | |
| 6,009,863 A | * 1/2000 | Tochizawa ................... | 123/572 |
| 6,065,457 A | 5/2000 | Hoffmann et al. | |
| D426,494 S | 6/2000 | Wimmer | |
| 6,092,498 A | * 7/2000 | Lohr et al. ................ | 123/90.38 |
| 6,095,105 A | * 8/2000 | Lohr et al. ................ | 123/90.38 |
| 6,263,847 B1 | 7/2001 | Hoffmann et al. | |
| 6,298,836 B1 | 10/2001 | Werner | |
| 6,345,613 B1 | 2/2002 | Hoffmann et al. | |
| 6,374,815 B1 | 4/2002 | Ness et al. | |
| 6,598,595 B2 | * 7/2003 | Yasui .......................... | 123/572 |
| 6,681,750 B2 | * 1/2004 | Mashiko ..................... | 123/572 |

* cited by examiner

Primary Examiner—Marguerite McMahon
(74) Attorney, Agent, or Firm—Davis & Bujold, P.L.L.C.

(57) ABSTRACT

The present invention provides a breather system for a motorcycle engine that has a chamber for collecting blow-by gas. The breather system comprises a manifold portion that has a wider portion and a narrower portion. The manifold portion is arranged to be disposed between an air-filter element and an inlet valve of the engine so as to channel air into the engine. The breather system further comprises a conduit that has an inlet which is arranged to receive the blow-by gas from the chamber and an outlet that is in use connected to the manifold portion such that a passage is provided between the chamber and the manifold portion. The manifold portion is arranged so that in use dynamic pressure of the channeled air at the wider portion of the manifold portion is lower than at the narrower portion and the established pressure gradient facilitates removal of the blow-by gas from the chamber.

6 Claims, 2 Drawing Sheets

BREATHER SYSTEM FOR A MOTORCYCLE ENGINE

FIELD OF THE INVENTION

The present invention broadly relates to a breather system for a motorcycle engine and relates particularly, though not exclusively, to a crankcase breather for a V-twin motorcycle engine. Throughout this specification, the term "manifold" is used for any conduit positioned between an inlet valve of an internal combustion engine and an air-filter of the engine.

BACKGROUND OF THE INVENTION

In internal combustion engines, such as 4-stroke motorcycle engines, a small portion of exhaust gases that are present after ignition of the air/fuel mixture in a cylinder of the engine penetrates between the cylinder and the piston into the crankcase. The amount of such "blow-by" usually increases as the engine wears.

The blow-by gas results in an increase of pressure in the crankcase that needs to be reduced in order to reduce loss of power or torque of the engine and consequently the crankcase typically is ventilated. In order to reduce toxic emission of the engine it is usually not permissible to ventilate the crankcase directly to the environment. Crankcase ventilation therefore usually comprises a tube that is connected with one end to a portion of the crankcase and with the other end to an air-filter element of the engine.

However, usually an oil-vapour is also emitted from the crankcase together with the exhaust and the ejected oil vapour will contaminate and eventually block-up the air-filter element. If the air filter element is contaminated, oil will typically be emitted directly into the environment.

SUMMARY OF THE INVENTION

The present invention provides in a first aspect a breather system for a motorcycle engine having a chamber for collecting blow-by gas, the breather system comprising a manifold portion having a wider portion and a narrower portion, the manifold portion being arranged to be disposed between an air-filter element and an inlet valve of the engine so as to channel air into the engine, and a conduit having an inlet being arranged to receive the blow-by gas from the chamber and an outlet that is in use connected to the manifold portion such that a passage is provided between the chamber and the manifold portion, wherein the manifold portion is arranged so that in use dynamic pressure of the channeled air at the wider portion of the manifold portion is lower than at the narrower portion and the established pressure gradient facilitates removal of the blow-by gas from the chamber.

The blow-by gas typically is directed through the inlet valve of the engine back into the engine. As the conduit is arranged for connection to the manifold portion between the air-filter element and the inlet valve of the engine, contamination and blocking-up of the air-filter element can substantially be avoided and the exhaust including oil and oil vapour originating from the crankcase is sucked away from the air-filter element into the inlet port during operation of the engine. This also reduces the probability that oil will reach the environment which therefore makes the breather system more environmentally friendly compared with systems where the blow-by gas is directed into the air-filter element.

Further, the oil vapour, if directed back into the engine, may function as an additional lubricant that would reduce wear of the engine.

In addition, as removal of blow-by gas is facilitated by the pressure gradient, the breather system may increase the performance, such as power and/or torque, of the motorcycle engine.

For example, the manifold portion may taper in cross-sectional area from the wider portion to the narrower portion. The inlet valve may be a throttle valve such as the throttle valve of a carburettor or a fuel injection system. The outlet of the conduit may be arranged for connection to a bottom portion of the manifold.

The inlet of the conduit may be arranged for connection to a cylinder head of the engine. In case of multi-cylinder engines, the breather system may comprise at least one bridge portion which is arranged to connect at least two of the cylinders or cylinder heads with the inlet of the conduit such that, in use, exhaust that enters the or each bridge portion from either of the at least two cylinders or cylinder heads will be guided through the conduit into the manifold between the inlet valve of the engine and the air-filter element.

For example, the motorcycle engine may be a V-twin engine arranged such that the crankshaft of the engine is oriented in a direction substantially perpendicular to the driving direction of the motorcycle. In this case the engine typically is an engine of a Harley Davidson motorcycle. The breather system may comprise a bridge-portion having a first end-portion arranged for connection to the rear cylinder head and a second end-portion arranged for connection to the front cylinder head. In this example, the second end-portion of the bridge portion is connected to the inlet of the conduit and the breather system is arranged so that, in use, exhaust that exits the rear cylinder head at the first end-portion of the bridge portion is guided through the bridge portion and, together with exhaust that exits the front cylinder head, is guided through the conduit into the manifold between air-filter element and the air or air/fuel inlet port. Alternatively, the first end-portion of the bridge portion may be connected to the inlet of the conduit and the breather system may be arranged so that, in use, exhaust that exits the front cylinder head at the second end-portion of the bridge portion is guided through the bridge portion and, together with exhaust that exits the rear cylinder head, is guided through the conduit into the manifold between air-filter element and the air or air/fuel inlet port.

The present invention provides in a second aspect a motorcycle engine having the above-defined breather system. The engine typically is arranged so that blow-by gas is directed through the inlet valve of the engine back into the engine.

The present invention provides in a third aspect a method of ventilating a chamber of a motorcycle engine, the chamber containing blow-by gas and the method comprising guiding the blow-by gas from the chamber into a conduit to a manifold portion disposed between an air-filter and an inlet valve of the engine, channeling air through the manifold portion into the engine, and facilitating throughput of blow-by gas from the chamber though the conduit into the manifold by inducing a pressure gradient of channeled air in the manifold portion.

Specific embodiments will now be described, by way of example only, with reference to the accompanying drawings.

DETAILED DESCRIPTION OF A SPECIFIC EMBODIMENT

Figure 1:
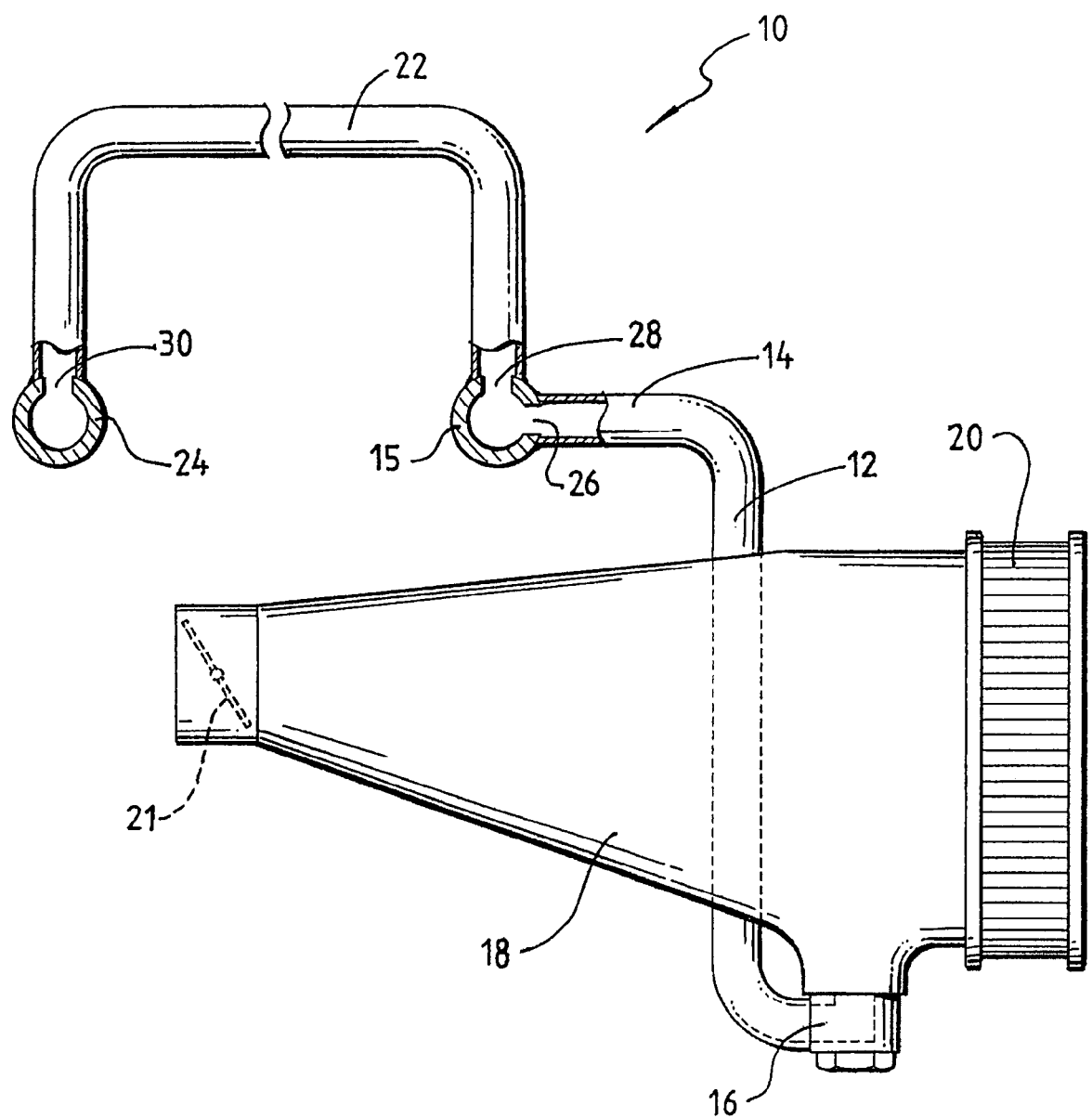
FIG. 1 shows a schematic cross-sectional representation of a breather system according to a specific embodiment and FIG. 2 shows an exploded schematic view of the a breather system according to another specific embodiment.

Referring initially to FIG. 1, the breather system is now described. FIG. 1 shows the breather system 10 which in this embodiment comprises an elongate tube 12 having a first end-portion 14 connected to a cylindrical portion 15. Cylindrical portion 15 is arranged for connection to a front cylinder head of a V-twin motorcycle engine (not shown). A second end-portion 16 of the tube 12 is connected to manifold 18 at a position between an air-filter element 20 and a throttle valve 21 of a carburettor.

In this example, the breather system 10 includes an elongate bride-portion 22 provided in form of an elongate tube. One end of the bridge-portion 22 is connected to the cylindrical portion 15. The other end of the bridge-portion 22 is connected to a cylindrical portion 24 which is arranged for connection to a rear cylinder head of the V-twin motorcycle engine (not shown).

The manifold portion 18 has a tapered cross-sectional area through which in use gas and air is directed to the throttle valve 21. In this embodiment, the manifold portion 18 is positioned so that the cross-sectional area is larger at the second end-portion 16 of the tube 12 than at the throttle valve. This arrangement results in the dynamic pressure being lower near the end-portion 16 than near the throttle valve 21. Consequently, throughput of blow-by gas from the crankcase through the tube 12 into the manifold 18 and back into the engine is facilitated.

The breather system 10 is composed of a metallic material, but may alternatively be composed of any other suitable material. The cylindrical portions 15 and 24 are hollow and the cylindrical portion 24 is welded to tube 22. The cylindrical portion 15 is welded to tubes 12 and 22. The cylindrical portion 15 has two apertures 26 and 28 and cylindrical portion 24 has one aperture 30. Cylindrical portions 15 and 24 are arranged for connection to the front and rear cylinder head, respectively, of the V-twin motorcycle engine by means or screws or bolts such that a passage is provided from the interior of the cylinder heads through the interior of the tubes 22 and 12 to the interior of the manifold 18.

Figure 2:
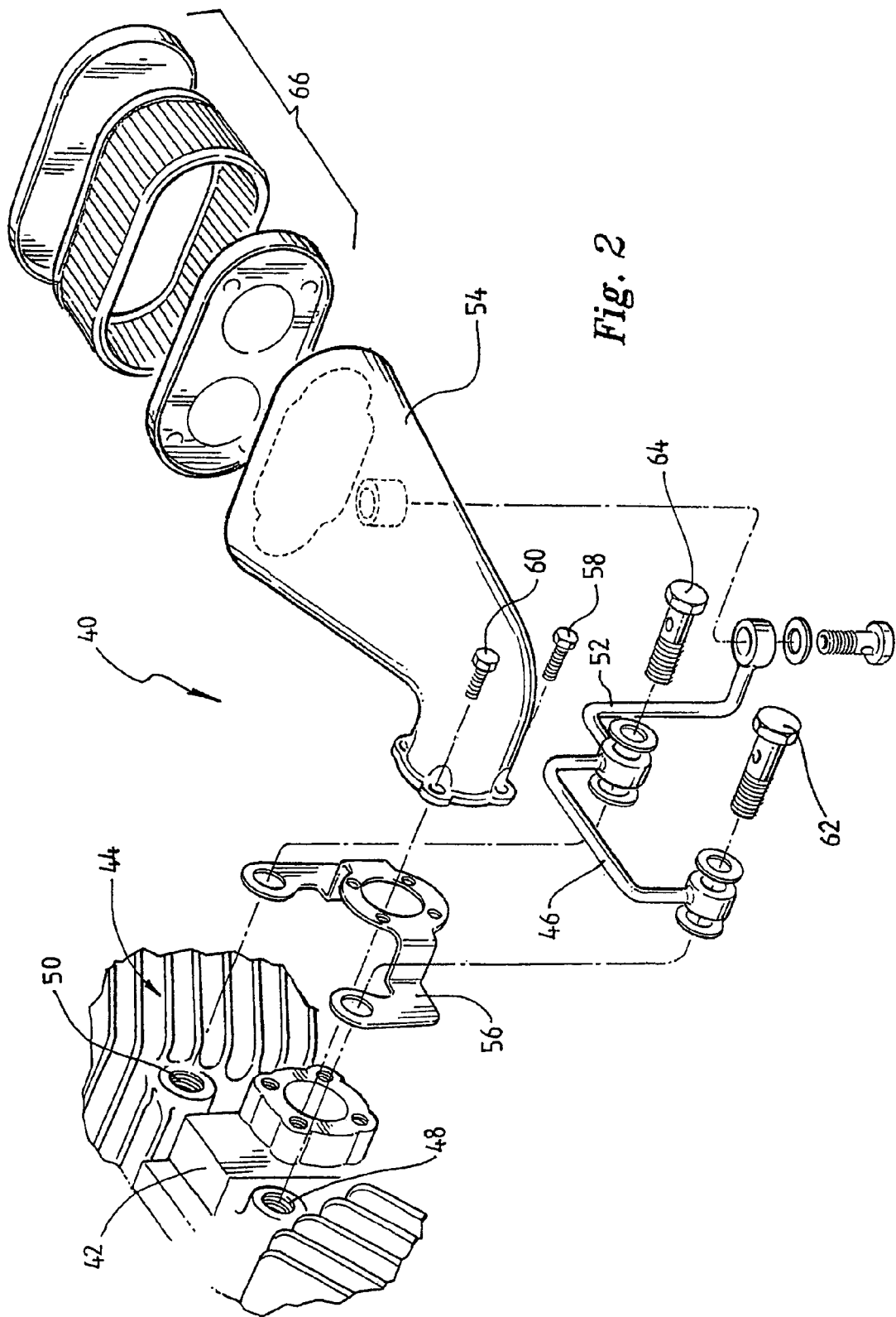

FIG. 2 shows another specific embodiment of the breather system. FIG. 2 shows the breather system 40 for connection to a carburettor 42 shown between the cylinder heads of a V-twin motorcycle engine 44. Connection portions of Tubular bridge portion 46 are in use connected to blow-by gas outlets 48 and 50 of the motorcycle engine 42. The bridge portion 46 is connected to manifold portion 54 via tubular conduit 52 and is arranged to guide blow-by gases into the manifold portion 54. Manifold portion 54 is connected to the engine 42 via holder 56 and secured using bolts 58 and 60, 62 and 64.

The breather 46 is connected to the outlet ports 48 and 50 using breather bolts 62 and 64 which comprise hollow portions or channels to guide the blow-by gas from the cylinder heads into the bridge portion 46.

The manifold portion is connected to an air filter 66 and has a cross-section which is larger at the connection of tubular conduit 52 than at the carburettor. Therefore, in use, the dynamic pressure at the connection of tube 52 is lower than at the carburettor which facilitates throughput of blow-by gas from the cylinder heads through tubes 46 and 52 and into the manifold portion 54 and back into the engine.

Although the invention has been described with reference to particular examples, it will be appreciated by those skilled in the art that the invention may be embodied in many other forms. For example, the breather system may be arranged for connection to a motorcycle engine other than a V-twin engine. Further, engine may not comprise a carburettor but a fuel injection system. In this case the breather system is connected to a manifold portion between an air-filter element and an air-intake valve of the engine.

What is claimed is:

1. A breather system for a motorcycle engine, the motorcycle engine being a V-twin engine having a rear and a front cylinder head and arranged such that a crankshaft of the engine is oriented in a direction substantially perpendicular to a driving direction of the motorcycle, the breather system having a chamber for collecting blow-by gas and comprising
   a manifold portion having a wider portion and a narrower portion, the manifold portion being arranged to be disposed between an air-filter element and a throttle valve, of the engine so as to channel air into the engine, and
   a conduit having an inlet being arranged to receive the blow-by gas from the chamber and an outlet that is in use connected to the manifold portion such that a passage is provided between the chamber and the manifold portion,
   the manifold portion being arranged so that in use dynamic pressure of the channeled air at the wider portion of the manifold portion is lower than at the narrower portion and an established pressure gradient facilitates removal of the blow-by gas from the chamber,
   a bridge portion incorporating a passage and having a first end-portion for connection to the rear cylinder head and a second end-portion for connection to the front cylinder head, the bridge portion being arranged to connect the rear and front cylinder heads with the inlet of the conduit such that, in use, the blow-by gas that enters the bridge portion from either of the rear or front cylinder heads will be guided through the conduit into the manifold portion.

2. The breather system as claimed in claim 1 wherein the manifold portion tapers in cross-sectional area from the wider portion to the narrower portion.

3. The breather system as claimed in claim 1 wherein the throttle valve is a throttle valve of a carburetor.

4. The breather system as claimed in claim 1 wherein the outlet of the conduit is arranged for connection to a bottom portion of the manifold.

5. A V-twin motorcycle engine having a rear and a front cylinder head and arranged such that a crankshaft of the engine is oriented in a direction substantially perpendicular to a driving direction of a motorcycle, the engine having a breathing system with a chamber for collecting blow-by gas, and the breather system comprising:
   a manifold portion having a wider portion and a narrower portion, the manifold portion being arranged to be disposed between an air-filter element and a throttle valve of the engine so as to channel air into the engine, and
   a conduit having an inlet being arranged to receive the blow-by gas from the chamber and an outlet that is in use connected to the manifold portion such that a passage is provided between the chamber and the manifold portion,
   wherein the manifold portion is arranged so that in use dynamic pressure of the channeled air at the wider portion of the manifold portion is lower than at the narrower portion and an established pressure gradient facilitates removal of the blow-by gas from the chamber, and a bridge portion incorporating a passage and having a first end-portion for connection to the rear cylinder head and a second end-portion for connection to the front cylinder head, the bridge portion being arranged to connect the rear and front cylinder heads with the inlet of the conduit such that, in use, the blow-by gas that enters the bridge portion from either of the rear or front cylinder heads will be guided through the conduit into the manifold portion.

6. The motorcycle engine as claimed in claim 5 being arranged so that blow-by gas is directed through the throttle valve of the engine back into the engine.

* * * * *